United States Patent [19]
McBride

[11] Patent Number: 6,098,987
[45] Date of Patent: Aug. 8, 2000

[54] MACHINERY SEAL

[75] Inventor: Tadd McBride, Riverton, Utah

[73] Assignee: Macrotech Polyseal, Inc., Salt Lake City, Utah

[21] Appl. No.: 09/208,392

[22] Filed: Dec. 9, 1998

[51] Int. Cl.⁷ .................................. F16J 15/32; F16J 9/28
[52] U.S. Cl. .................. 277/436; 277/448; 277/552; 277/566; 277/582; 277/584
[58] Field of Search .................. 277/436, 437, 277/448, 552, 566, 580, 582, 584

[56] References Cited

U.S. PATENT DOCUMENTS

| | | |
|---|---|---|
| 2,799,523 | 7/1957 | Parker . |
| 3,023,014 | 2/1962 | Donner . |
| 3,601,419 | 8/1971 | Fern . |
| 4,089,534 | 5/1978 | Litherland . |
| 4,201,392 | 5/1980 | Watts . |
| 4,426,090 | 1/1984 | Bender . |
| 4,556,223 | 12/1985 | VanLoon et al. . |
| 4,893,823 | 1/1990 | Strouse et al. . |
| 4,900,042 | 2/1990 | Genda . |
| 5,269,537 | 12/1993 | Kiesel . |

*Primary Examiner*—Anthony Knight
*Assistant Examiner*—John L. Beres
*Attorney, Agent, or Firm*—Lyon, P.C.

[57] ABSTRACT

A seal assembly for a groove or seal gland in a relatively stationary machine part for sealing an axially displaceable machine part extending therethrough comprises a relatively flexible seal element supported by a relatively rigid support element. The seal element has a static seal that bears on a radial wall of the seal gland to provide superior back-pressure relief while maintaining proper seal element position in the seal gland.

6 Claims, 1 Drawing Sheet

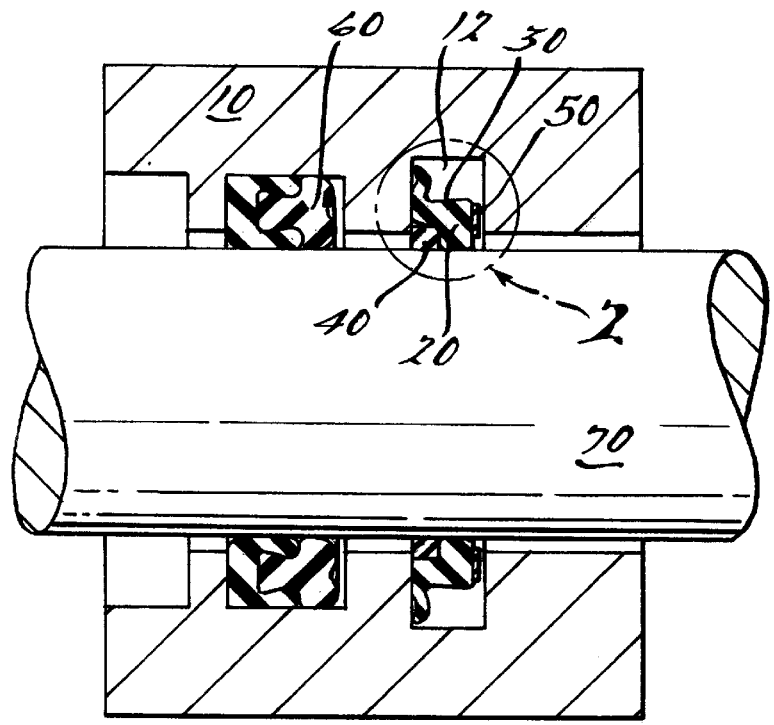
Fig. 1.
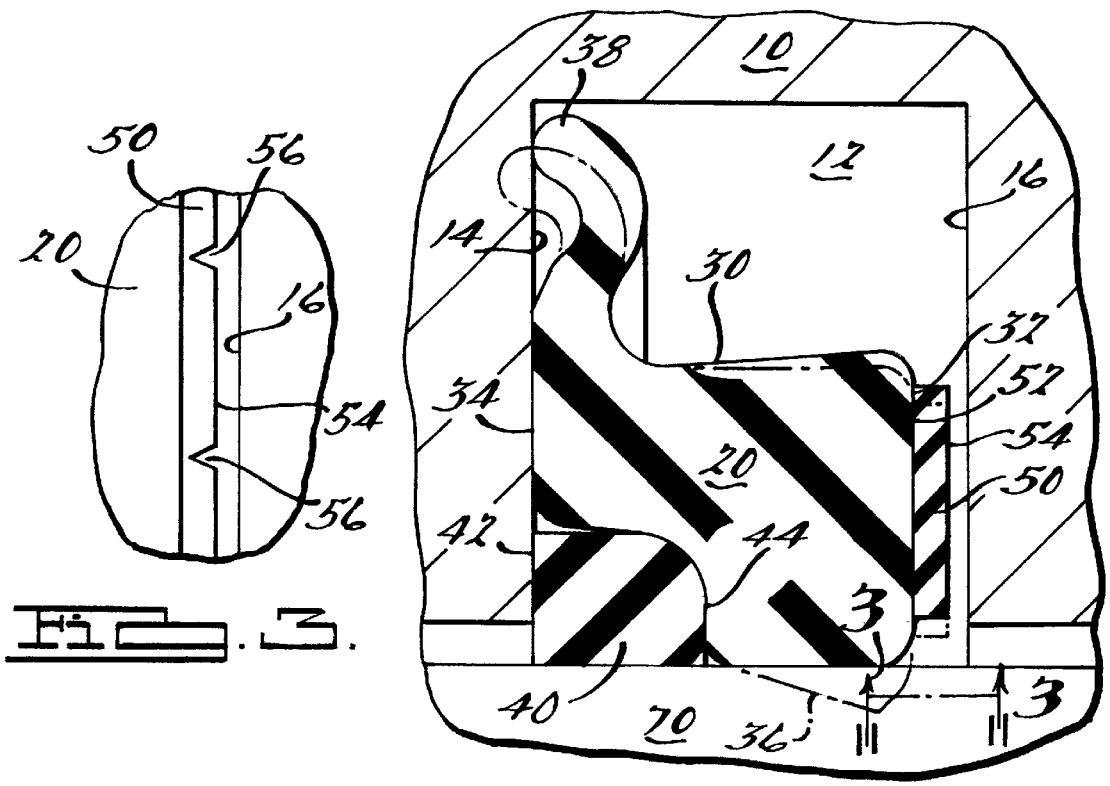
Fig. 2.
Fig. 3.

ABSTRACT

MACHINERY SEAL

BACKGROUND OF THE INVENTION

The instant invention relates generally to composite material machinery seals disposed in grooves or seal glands to provide a fluid seal between relatively moving machinery parts. Specifically, the invention comprises a seal element having a relatively large central mass, static and dynamic sealing lips thereon, and an axial vented element to provide superior sealing characteristics while preventing fluid pressure build-up between seal stages in multiple seal systems.

U-rings are known-in-the art seals for pistons or rods, or any axially displaceable machine part moveable through an annular passage in a complementary part. They provide a fluid barrier between reciprocating piston rods or pistons and a fluid under pressure by means of a dynamic sealing lip that bears against a rod shaft or a piston wall.

In high pressure fluid system applications, for example hydraulic systems for heavy machinery, it is well known in the art to use a plurality of U-ring seal assemblies arranged in series along the axis of a shaft or piston to prevent high pressure fluid from leaking past the seals. The upstream seals in these multi-seal arrangements are known as buffer seals. They serve to protect the primary rod or piston seal from high-pressure surges, thereby extending the useful life thereof.

However, the aforementioned serial arrangement of seal assemblies in high-pressure applications suffers from several disadvantages. Buffer seals must release any pressure that may exist in the area between the primary seal and the buffer seal or seals when that pressure exceeds system fluid pressure. Conventional U-ring seals are often made from flexible material that tends to rotate in the seal gland (or groove) thereby causing the static sealing lip thereof to contact an axial wall of the seal gland. This rotation and the subsequent contact of the seal assembly with the axial wall of the seal groove results in failure of the seal to release the pressure build-up between seal stages. The pressure build-up can become substantially greater than system fluid pressure, thereby causing damage to the primary system seals and poor cylinder efficiency.

SUMMARY OF THE INVENTION

The instant invention solves the aforementioned problems by providing a seal assembly having a sealing element with a relatively large central mass disposed within a groove in proximity to the displaceable machine part to be sealed. A dynamic seal lip thereon is biased against and bears on the displaceable machine part to prevent the flow of fluid therebetween.

In contradistinction to known U-ring seal assemblies having static sealing lips disposed on the outer radial wall of the seal groove, the seal assembly of the present invention is provided with a static sealing lip disposed on an axial wall of the seal the seal assembly of the present groove. This sealing lip arrangement serves to enhance the effectiveness of the seal assembly in handling a pressure spike, thereby protecting the primary seal. The flexible static sealing lip also provides for a low activation differential pressure to readily relieve back pressure that becomes trapped between seal assemblies.

The instant invention employs a support element made from a high modulus material such as reinforced nylon shaped to nest with the central mass of the sealing element and provide support thereto. The high modulus support element ensures proper orientation of the sealing element in the seal groove, thereby improving seal operation at high system pressures.

Additionally, the instant invention employs a vented axial element secured to an axial face of the sealing element to prevent the seal assembly from sealing when the displaceable machine part is moving in the reverse direction, thereby eliminating trapped pressure that adversely affects seal life.

It is therefore one object of the instant invention to provide a seal assembly having an axial element that allows system fluid to vent back to the system to obviate pressure build-up in multi-stage seal arrangements.

It is a further object of the instant invention to provide a seal assembly having a flexible static sealing lip biased against an axial surface of a seal gland thereby providing enhanced resistance to system pressure spikes. Placement of the seal of the present invention upstream of a primary seal prevents primary seal damage resulting from pressure spikes thus enhancing cylinder efficiency and life.

A yet further object of the invention is to provide a seal assembly having a stable mass of seal material disposed within a seal gland and supported by a high modulus material support element. The support element ensures that the seal element retains proper orientation in the seal groove throughout the useful life of the assembly.

Additional objects, features, and advantages of the present invention will become apparent from the subsequent detailed description, taken in conjunction with the accompanying drawing figures.

BRIEF DESCRIPTION OF THE DRAWINGS

FIG. 1 is a fragmentary cross-section through a seal assembly of the instant invention shown mounted a round a displaceable shaft.

FIG. 2 is a view of the instant invention defined by the circle 2 in FIG. 1, enlarged for clarity.

FIG. 3 is a view taken along the line 3—3 of FIG. 2.

DETAILED DESCRIPTION OF THE PREFERRED EMBODIMENT(S)

Referring to drawing FIG. 1, and in accordance with the preferred embodiment of the instant invention, a relatively stationary machine part 10 has a circumferential groove 12 therein for acceptance of an annular buffer seal assembly 20. The seal assembly 20 comprises a seal element 30, a high modulus material support element 40, and an axial element 50. The seal element 30 and the axial element 50 are made of a relatively flexible, elastic material, such as polyurethane, while the support element 40 is fabricated from a relatively rigid, durable material such as reinforced nylon or acetyl. As depicted in FIG. 1l, the buffer seal assembly 20 is positioned upstream of a primary seal assembly 60 thereby insulating the primary seal assembly 60 from pressure spikes caused by events such as cylinder bottoming or valve malfunctions.

As shown in FIG. 2, the annular seal element 30 has an axially inner face 32 and an axially outer face 34 for acceptance in the circumferential groove 12. In one embodiment of the instant invention the axially inner and outer faces, 32 and 34 respectively, have a right circular cylindrical shape engageable with juxtaposed edges of the circumferential groove 12.

The seal element 30 is provided with a radially inner dynamic sealing lip 36 extending radially inward to provide radial interference with an axially displaceable machine part 70 movable within the relatively stationary machine part 10. The dynamic sealing lip 36 bears on the axially displaceable machine part 70 to provide a seal thereabout and to protect the primary seal assembly 60 from the damaging effects of pressure spikes.

In accordance with another feature of the present invention, the seal element 30 has a radially outer static sealing lip 38, also made from a flexible, elastic material such as polyurethane. The static sealing lip 38 extends radially outward from the axially outer face 34 of the seal element 30 thereby bearing upon an axial wall 14 of the circumferential groove 12. The static sealing lip 38 biases the seal element 30 radially inward, thereby forcing the dynamic sealing lip 36 against the axially displaceable machine part 70 to effect the sealing thereof.

The static sealing lip 38 has a low activation differential buffer pressure such that pressure build-up between the buffer seal assembly 20 and the primary seal assembly 60 is readily relieved by flexure of the static sealing lip 38 and the attendant radial motion permitted of the seal assembly 20 thereby.

The annular support element 40 is provided with a right circular cylindrical axially outer face 42 engageable with the axial wall 14 of the circumferential groove 12, and an axially inner face 44 shaped to accept the seal element 30 in a nesting relationship. The support element 40 operates to enhance the stability of the seal element 30 within the groove 12, thereby providing the seal assembly 10 with improved pressure handling characteristics.

The axial element 50 is disposed between the seal element 30 and a second axial wall 16 of the seal groove 12, and has a first axial face 52 secured to the axially inner face 32 of the seal element 30 and a second axial face 54 disposed adjacent a second axial wall 16 of the circumferential groove 12. The axial element 50 is also generally annular in shape and preferably fabricated from a relatively rigid, durable material such as nylon or acetyl.

As shown in FIG. 3, the axial element 50 has a plurality of axial passages 56 therein to allow fluid communication between the seal groove 12 and the axially displaceable machine part 70. This feature of the instant invention prevents the assembly 20 from sealing when the axially displaceable machine part 70 travels in a reverse direction, thereby preventing a pressure trap between the buffer seal assembly 20 and the primary seal assembly 60. The axial passages 56 may be arranged at regular intervals around the annular axial element 50, depending upon system fluid pressure relief requirements.

While the preferred embodiment of the instant invention has been disclosed in detail, it will be appreciated by one of ordinary skill in the art that the instant invention is susceptible to various modifications without departing from the scope of the following claims.

I claim:

1. A seal assembly for a groove in a relatively stationary machine part for sealing an axially displaceable machine part extending therethrough, said groove having first and second axially spaced walls and an outer radial wall, comprising:

an annular seal element disposed in said groove having a radially inner dynamic sealing lip for bearing on said axially displaceable machine part, and a radially outer flexible static sealing lip for bearing on a one of said groove axial walls and biasing the inner sealing lip radially inward;

an annular support element having a right circular cylindrical axially outer face engageable with said groove axial first wall, said support element further having an axially inner face shaped to accept said seal element in a nesting relationship;

an annular axial element having a first axial face secured to said seal element and a second axial face adjacent said groove second axial wall, said axial element having a plurality of passages radially therethrough providing for fluid communication between said groove and said axially displaceable machine part thereby preventing said seal assembly from sealing in a reverse direction.

2. A seal assembly for a groove in a relatively stationary machine part for sealing an axially displaceable machine part extending therethrough, said groove having first and second axially spaced walls and an outer radial wall, comprising:

an annular seal element having right circular cylindrical axially inner and outer faces for acceptance in said groove, a radially inner sealing lip for bearing on said axially displaceable machine part, and a radially outer flexible sealing lip extending from said axially outer face for bearing on one of said gland axial walls and biasing the inner sealing lip radially inward;

an annular support element having a right circular cylindrical axially outer face to engageable with said groove axial first wall, said support element further having an axially inner face shaped to accept said seal element in a nesting relationship;

a right circular cylindrical axial element having a first axial face secured to said axially inner face of said seal element and a second axial face adjacent said groove second axial wall, said axial element having a plurality of passages radially therethrough providing for fluid communication between said groove radial wall and said axially displaceable machine part thereby preventing said seal assembly from sealing in a reverse direction.

3. A seal assembly as claimed in claim 1 wherein said seal element and said axial element are comprised of a relatively flexible elastic material and wherein said support element is comprised of a relatively rigid durable material.

4. A seal assembly as claimed in claim 2 wherein said seal element and said axial element are comprised of a relatively flexible elastic material and wherein said support element is comprised of a relatively rigid durable material.

5. A seal assembly as claimed in claim 1 wherein said seal element and said axial element are comprised of a polyurethane material and wherein said support element is comprised of a nylon material.

6. A seal assembly as claimed in claim 2 wherein said seal element and said axial element are comprised of a polyurethane material and wherein said support element is comprised of a nylon material.

* * * * *